United States Patent
Mountain

(10) Patent No.: US 8,850,488 B2
(45) Date of Patent: Sep. 30, 2014

(54) SYSTEMS AND METHODS FOR ACCESSING ELECTRONIC PROGRAM GUIDE INFORMATION OVER A BACKCHANNEL COMMUNICATION PATH

(75) Inventor: Dale Mountain, West Yorkshire (GB)

(73) Assignee: Eldon Technology Limited, Steeton, Keighley (GB)

( * ) Notice: Subject to any disclaimer, the term of this patent is extended or adjusted under 35 U.S.C. 154(b) by 783 days.

(21) Appl. No.: 12/473,619

(22) Filed: May 28, 2009

(65) Prior Publication Data
US 2010/0306804 A1 Dec. 2, 2010

(51) Int. Cl.
| | |
|---|---|
| G06F 3/00 | (2006.01) |
| G06F 13/00 | (2006.01) |
| H04N 5/445 | (2011.01) |
| H04N 21/262 | (2011.01) |
| H04N 21/462 | (2011.01) |
| H04N 21/81 | (2011.01) |
| H04N 21/84 | (2011.01) |
| H04N 21/434 | (2011.01) |
| H04N 21/2362 | (2011.01) |
| H04N 21/472 | (2011.01) |
| H04N 21/254 | (2011.01) |
| H04N 7/173 | (2011.01) |
| H04N 21/437 | (2011.01) |
| H04N 21/426 | (2011.01) |
| H04N 21/236 | (2011.01) |

(52) U.S. Cl.
CPC .......... *H04N 21/472* (2013.01); *H04N 21/262* (2013.01); *H04N 21/26291* (2013.01); *H04N 21/4622* (2013.01); *H04N 21/8133* (2013.01); *H04N 21/84* (2013.01); *H04N 21/4345* (2013.01); *H04N 21/2362* (2013.01); *H04N 21/26266* (2013.01); *H04N 21/254* (2013.01); *H04N 7/17318* (2013.01); *H04N 5/44543* (2013.01); *H04N 21/26283* (2013.01); *H04N 21/4349* (2013.01); *H04N 21/437* (2013.01); *H04N 21/42615* (2013.01); *H04N 21/23617* (2013.01)
USPC ................. 725/54; 725/37; 725/38; 725/39; 725/46; 725/47; 725/105

(58) Field of Classification Search
CPC .......... H04N 21/23617; H04N 21/262; H04N 21/26266; H04N 21/26291; H04N 21/4349; H04N 21/437; H04N 21/462; H04N 21/472
USPC ..................................... 725/37–61, 109–111
See application file for complete search history.

(56) References Cited

U.S. PATENT DOCUMENTS

| | | | |
|---|---|---|---|
| 6,002,394 A | * | 12/1999 | Schein et al. .................... 725/39 |
| 6,915,528 B1 | * | 7/2005 | McKenna, Jr. .................. 725/37 |

(Continued)

FOREIGN PATENT DOCUMENTS

| | | |
|---|---|---|
| EP | 2056604 A1 | 5/2009 |
| JP | 2000152113 | 5/2000 |

(Continued)

OTHER PUBLICATIONS

Eitz G., Zukuenftige Informations—Und Datenangebote Beim Digitalen Fernsehen—EPG Und Lesezeichen; Rundfunktecnische Mitteilungen, Mensing. Norderstedt, DE, vol. 41, No. 2, Jun. 1, 1997, pp. 67-72, XP000696795, ISSN: 0035-9890.

*Primary Examiner* — Jeremy Duffield
(74) *Attorney, Agent, or Firm* — Lowe Graham Jones PLLC

(57) ABSTRACT

A systems and methods access electronic program guide (EPG) information via a backchannel link. An exemplary embodiment receives a first portion of EPG information residing in a data channel of a program content stream, establishes a communication link between a media device and a remote EPG content system, and receives a second portion of EPG information from the remote EPG content system via the established communication link.

18 Claims, 1 Drawing Sheet

(56) References Cited

U.S. PATENT DOCUMENTS

| | | |
|---|---|---|
| 7,388,887 B2 | 6/2008 | Gray, III et al. |
| 2002/0059623 A1* | 5/2002 | Rodriguez et al. ............... 725/91 |
| 2002/0078453 A1* | 6/2002 | Kuo ................................. 725/46 |
| 2003/0208761 A1* | 11/2003 | Wasserman et al. ............ 725/53 |
| 2003/0226147 A1 | 12/2003 | Richmond et al. |
| 2004/0002987 A1* | 1/2004 | Clancy et al. .................. 707/101 |
| 2004/0073923 A1* | 4/2004 | Wasserman ..................... 725/46 |
| 2004/0177161 A1 | 9/2004 | Hoang |
| 2004/0190779 A1* | 9/2004 | Sarachik et al. ............... 382/199 |
| 2006/0064716 A1* | 3/2006 | Sull et al. ........................ 725/37 |
| 2006/0064722 A1 | 3/2006 | Michel et al. |
| 2006/0123448 A1 | 6/2006 | Ma et al. |
| 2007/0089141 A1* | 4/2007 | Gordon et al. .................. 725/61 |
| 2007/0245019 A1 | 10/2007 | Westberg et al. |
| 2008/0083005 A1* | 4/2008 | Kim ............................... 725/118 |
| 2008/0216138 A1 | 9/2008 | Minnick |
| 2008/0229364 A1 | 9/2008 | Ryu et al. |
| 2009/0070828 A1* | 3/2009 | Stomakhin et al. ............. 725/68 |
| 2009/0094230 A1 | 4/2009 | Sakata et al. |
| 2009/0199242 A1* | 8/2009 | Johnson et al. ................. 725/46 |

FOREIGN PATENT DOCUMENTS

| | | |
|---|---|---|
| JP | 2001054091 | 2/2001 |
| JP | 2002300564 | 10/2002 |
| JP | 2002305697 | 10/2002 |
| JP | 2002369094 | 12/2002 |
| JP | 2003189267 | 7/2003 |
| JP | 2009094658 | 4/2009 |
| WO | 03015408 A1 | 2/2003 |

* cited by examiner

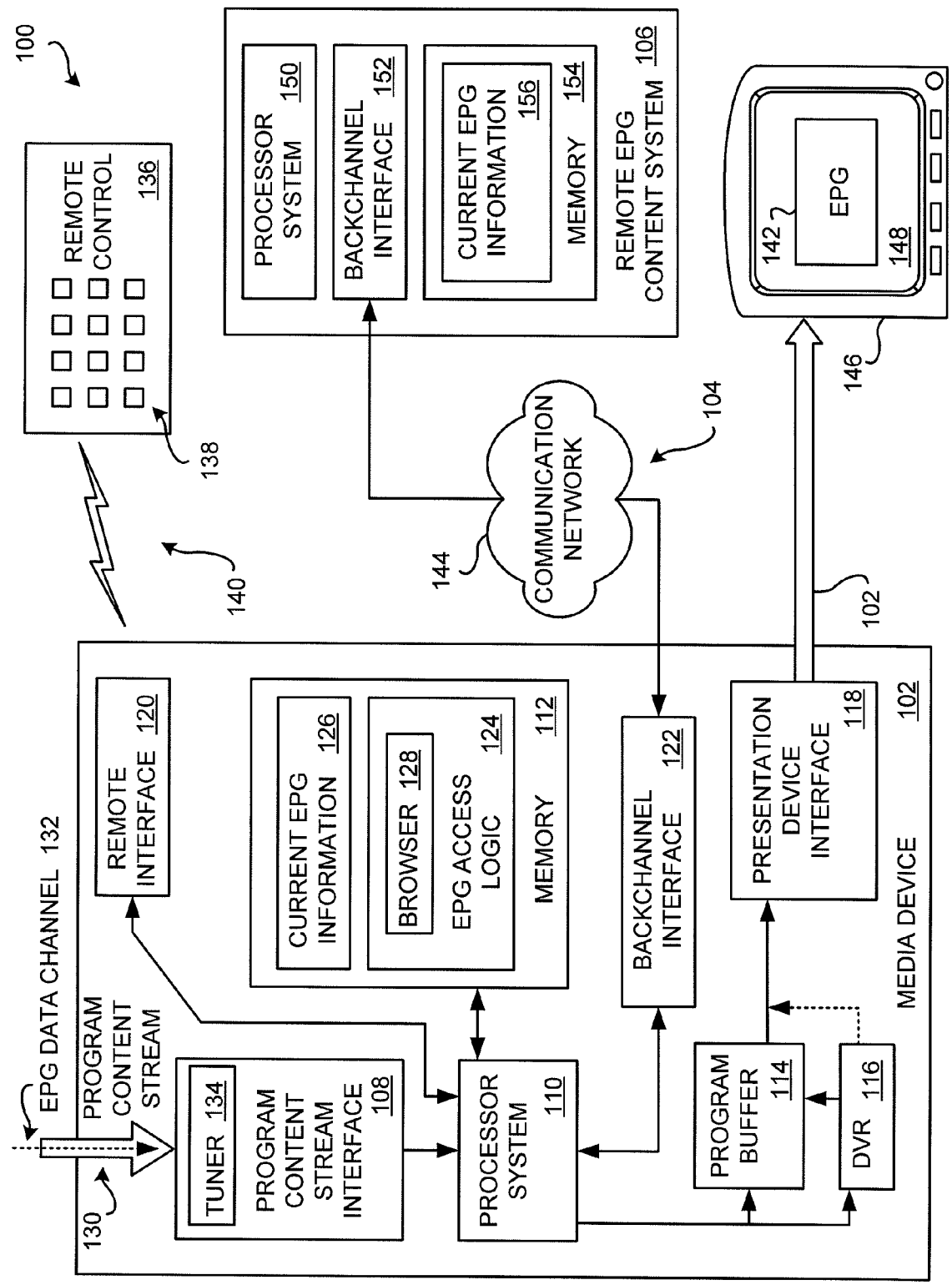

SYSTEMS AND METHODS FOR ACCESSING ELECTRONIC PROGRAM GUIDE INFORMATION OVER A BACKCHANNEL COMMUNICATION PATH

BACKGROUND

Electronic program guide (EPG) information is communicated to a set top box (STB) using a dedicated data channel. The EPG information may include, but is not limited to, the scheduled presentation start and/or end time, the program channel, and descriptive information for the program. The program's descriptive information may include the title of the program, names of performers or actors, date of creation, and/or a summary describing the plot or story line of the program. Any suitable information may be included in the program information.

A tuner in the STB "tunes" to the EPG data channel and collects the EPG information, which is stored in memory of the STB. The EPG information is communicated in a serial fashion to the STB, and thus, has a beginning and an end. For example, the EPG information may start with "program channel 1" and provide programming information for a predefined number of days or the like for that particular channel. Next, EPG information for "program channel 2" for the predefined number of days or the like may follow, and so on, until the EPG information for all "program channels" has been communicated to the STB. The communication of the EPG information then starts again at the beginning of the EPG information. In some instances, the EPG information may simply be repeated. At other times, the EPG information may be updated and then communicated. This looped, periodically repeating communication of the entire EPG information is referred to as a "carousel" EPG information format.

If the STB begins receiving the EPG information midway during the communication of the "carousel" of EPG information, the STB understands that a complete set of EPG information has been received when it has gone through the entire carousel of EPG information. That is, the entire carousel of EPG information has been received when the received EPG information has returned to its initial entry point into the carousel of EPG information.

While the STB is receiving the EPG information, or once the STB has received a full set of EPG information, the STB can construct and display an EPG to a viewer on their viewing device, such as a television or the like. If the entire carousel of EPG information has not yet been received, a partial EPG may be constructed and presented to the viewer.

The viewer is able to interactively scroll about the EPG to view available programming on a program channel of interest. Also, the viewer is able to navigate about the EPG to view scheduled programming at future times of interest on selected program channels of interest. Some EPGs are configured to, based upon commands received from a remote control, cooperatively work with a remote control so that the viewer may request selected operations on a program of interest that is highlighted on the EPG. For example, the viewer may select a record feature on their remote control unit such that the highlighted program on the EPG is recorded by a digital video recorder (DVR) in the STB.

When the EPG is not available in the STB memory, the STB must acquire the entire amount of EPG information and store it in memory. This situation may occur when the STB is initialized, if the EPG is outdated, or if the EPG information has been corrupted. This process of acquiring an entire carousel of EPG information requires a significant amount of time because of the large amount of data associated with the entire carousel of EPG information. Further, storing the entire carousel of EPG information that encompasses a relatively long period of time, such as several days or weeks, utilizes a large portion of the STB's dynamic memory capacity.

At some point, the stored EPG information must be updated (refreshed) to remove information regarding programming that has already been presented, and to acquire updates pertaining to future scheduled programming. If some or all of the EPG information has already been stored in the STB's memory, then the STB can monitor the communicated EPG information and simply add EPG information updates as needed to keep a current EPG database of programming information. However, receiving a full set of EPG information updates still requires the STB to monitor the entirety of the communicated carousel of EPG information. Thus, obtaining EPG information updates requires substantially the same amount of time that is required for acquiring the new set of EPG information.

Accordingly, there is a need to provide for more efficient and faster acquisition of EPG information.

SUMMARY

Systems and methods of accessing an electronic program guide (EPG) over a backchannel link are disclosed. An exemplary embodiment has a program content stream interface configured to receive at least one program channel and an EPG data channel with a first portion of EPG information therein, a backchannel interface configured to establish a communication link to a remote EPG content system and configured to receive a second portion of EPG information, and a processor system communicatively coupled to the program content stream interface and the backchannel interface. The processor system constructs an EPG from the first portion of EPG information and the second portion of EPG information.

In accordance with further aspects, an exemplary embodiment receives a first portion of EPG information residing in a data channel of a program content stream, establishes a communication link between a media device and a remote EPG content system, and receives a second portion of EPG information from the remote EPG content system via the established communication link.

BRIEF DESCRIPTION OF THE DRAWINGS

Preferred and alternative embodiments are described in detail below with reference to the following drawings:

FIG. 1 is a block diagram of an embodiment of the electronic program guide (EPG) access system.

DETAILED DESCRIPTION

FIG. 1 is a block diagram of an embodiment of the electronic program guide (EPG) access system 100. An exemplary embodiment of the EPG access system 100 includes a media device 102, a backchannel system 104, and a remote EPG content system 106. An exemplary embodiment of the media device 102 includes, but is not limited to, a set top box (STB). Embodiments of the EPG access system 100 may be implemented in other media devices, such as, but not limited to, stereos, radios, televisions (TVs), digital video disc (DVD) players, digital video recorders (DVRs), personal device assistants (PDAs), or personal computers (PCs).

The backchannel system 104 is a two-way communication system that communicatively couples the media device 102 and the remote EPG content system 106. Communication over the backchannel system 104 is established over a physical path and/or a logical path, referred to herein as a link. Once the backchannel system 104 is established between the media device 102 and the remote EPG content system 106, EPG information can be communicated from the remote EPG content system 106 to the media device 102.

In various situations, the media device 102 establishes the link to the remote EPG content system 106 and then accesses the remote EPG content system 106 to retrieve (pulls) selected EPG information of interest. Pulling the EPG information refers to the media device 102 specifying to the remote EPG content system 106 what EPG information the media device has requested. The requested media information may be identified by a program channel, a time of day, and/or other program indicia. For example, the media device 102 may specify EPG information for a currently viewed program channel based on a current time and ending at some predefined period, such as several hours. Or, the media device 102 may specify EPG information for a plurality of program channels beginning at a specified future date and/or time, and ending at a second future date and/or time.

In other situations, the remote EPG content system 106 sends (pushes) EPG information to the media device 102. In one embodiment, the EPG information pushed to the media device 102 is based upon a time that the backchannel system 104 is established between the media device 102 and the remote EPG content system 106. Alternatively, or additionally, the EPG information may be pushed to the media device 102 beginning at substantially the start time that the media device 102 is turned on, and includes EPG information encompassing a predefined period. In the various embodiments, the predefined EPG information that is pushed to the media device 102 upon establishment of the link to the remote EPG content system 106 may be based on any suitable predefined criteria.

The non-limiting exemplary media device 102 comprises a program content stream interface 108, a processor system 110, a memory 112, a program buffer 114, an optional digital video recorder (DVR) 116, a presentation device interface 118, a remote interface 120, and a backchannel interface 122. The memory 112 comprises portions for storing EPG access logic 124 and EPG information 126. The EPG information 126 contains program information pertaining to programs that are currently available or that will be available in the future.

In some embodiments, a browser 128 or the like may be integrated into the EPG access logic 124. Accordingly, when the remote EPG content system 106 is implemented as an internet accessible system, the browser 128 can access EPG information of interest. Alternatively, the browser 128 may be separately implemented as part of another component and/or function.

Other media device embodiments may include some, or may omit some, of the above-described media processing components. Further, additional components not described herein may be included in alternative embodiments.

The functionality of the media device 102, here an exemplary STB, is now broadly described. One or more program content streams 130 are received by the program content stream interface 108. Optionally, an EPG data channel 132 is received in the program content stream 130. The EPG data channel 132 includes EPG information provided as the carousel of EPG information that is communicated in a periodic, serial fashion. That is, the EPG information in the EPG data channel 132 is communicated in a serial format that is periodically repeated.

One or more tuners 134 in the program content stream interface 108 selectively tune to one of the program content streams 130 in accordance with instructions received from the processor system 110. A program content stream 130 typically comprises a plurality of programs multiplexed together. The processor system 110, based upon a request for a program of interest specified by a viewer, parses out program content associated with the program of interest. The program of interest is then assembled into a stream of video and/or audio information which may be saved into the program buffer 114 such that the program content can be streamed out to the media presentation device 146, such as the television, via the presentation device interface 118. Alternatively, or additionally, the parsed out program content may be saved into the DVR 116 for later presentation.

From time to time, in embodiments that utilize EPG information provided in the entire carousel of EPG information, the tuner 134 is tuned to the EPG data channel 132. EPG information is received from the EPG data channel 132 and is stored into the EPG information 126. If the media device 102 has a single tuner 134, the tuner 134 may be tuned to the EPG data channel 132 at times when the media device 102 is not being used so that EPG information can be received without interfering with program viewing. If the media device 102 has multiple tuners, one of the tuners may be used to provide viewable programming and another tuner can be used to tune to the EPG data channel 132 to receive the carousel of EPG information.

The exemplary media device 102 is configured to receive instructions from a viewer via a suitable control device, such as, but not limited to, the exemplary remote control 136. The remote control 136 includes one or more controllers 138. The viewer, by actuating one or more of the controllers 138, causes the remote control 136 to generate and transmit instructions, via a wireless signal 140, to the media device 102 to control presentation of information shown on an EPG 142. Alternatively, or additionally, the media device 102 may itself have one or more controllers thereon that are configured to receive instructions from the viewer. Thus, the viewer may input instructions to have the EPG access system 100 generate and present the EPG 142 on an available display.

A selected program of interest, typically selected by the viewer using commands from the remote control 136, are streamed out from the program buffer 114 or the DVR 116 to the presentation device interface 118. The presentation device interface 118 is communicatively coupled to the media presentation device 146 having a display 148. Accordingly, the selected program of interest is communicated from the presentation device interface 118 to the media presentation device 146. The video portion of the selected program is presented on the display 148 and an audio portion is provided over speakers (not shown). A non-limiting example of the media presentation device 146 is a television.

Occasionally, a viewer will wish to view an EPG 142 on their media presentation device 146. Accordingly, the EPG information 126 is retrieved from the memory 112 and the EPG 142 is constructed therefrom and communicated to the media presentation device 146 via the presentation device interface 118. For the EPG 142 to be a useful tool to the user, the EPG information needs to be current. That is, currently available programming and programming scheduled for further presentation must be presentable in the EPG 142. Embodiments of the EPG access system 100 enable the media device 102 to access the remote EPG content system 106 so that program information may be retrieved from the remote EPG content system 106 and incorporated into the displayed EPG 142.

The media device 102 includes a backchannel interface 122. The backchannel interface 122 is configured to communicatively couple the media device 102 with the remote EPG content system 106 via the backchannel system 104. The backchannel interface 122 may be any suitable communication device or system operable to communicate over the communication network 144.

The communication network 144 is illustrated as a generic communication system. In one embodiment, the communication network 144 comprises the Internet. Accordingly, the backchannel interface 122 is a modem or other type of Internet communication device. Alternatively, the communication network 144 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In such embodiments, the backchannel interface 122 is configured to establish a communication link or the like with the communication network 144 on an as-needed basis, and is configured to communicate over the particular type of communication network 144 that it is coupled to.

The non-limiting exemplary remote EPG content system 106 comprises a processor system 150, a backchannel interface 152, and a memory 154. A portion of the memory 154 stores the current EPG information 156. The current EPG information 156 is selectively updated with current program schedule information and other information. The updating may occur periodically, or as new EPG information becomes available. The current EPG information 156 may be updated in any suitable manner.

In the various embodiments, the current EPG information 156 is structured so as to be available to the media device 102 via the backchannel system 104. Thus, when a link is established between the backchannel interface 122 of the media device 102 and the backchannel interface 152 of the remote EPG content system 106, the media device 102 has access to the current EPG information 156 stored at the remote EPG content system 106.

In an exemplary embodiment, the backchannel system 104 is an Internet-based communication system. Thus, the backchannel interface 152 of the remote EPG content system 106 is a server, or server-like device, that accepts commands and information using hypertext transfer protocol (HTTP) requests from a web browser agent, here, the media device 102. In an exemplary embodiment, the backchannel interface 122 of the media device 102 is a modem, or modem-like device. The browser 128 enables access by the media device 102 to the current EPG information 156 at the remote EPG content system 106.

The current EPG information 156 of the remote EPG content system 106 may be formatted using a suitable video data standard, such as, but not limited to, the moving pictures experts group (MPEG) digital video broadcasting (DVB) standard or the American television standards committee (ATSC) standard. Thus, the EPG information is encoded using a common internet protocol (IP) format that may be selectively accessed by the browser 128 in the media device 102. For example, HTTP or XML formats may be used.

In an Internet-based environment, the media device 102 establishes a link to the remote EPG content system 106 via the communication network 144, such as, but not limited to, world wide web (WWW). The established backchannel system 104 may be a persistent connection. Non-limiting example of possible persistent type connections are a HTTP keep-alive or a HTTP connection reuse. In other embodiments, particularly where the backchannel system 104 can be quickly established, the backchannel system 104 is established on an as-needed basis.

In some embodiments, activation of the media device 102 initiates establishment of the link between the backchannel interface 122 of the media device 102 and the backchannel interface 152 of the remote EPG content system 106. Updates of EPG information from the current EPG information 156 of the remote EPG content system 106 are pushed to the media device 102. The received EPG updates are incorporated and/or are saved into the current EPG information 126 of the media device 102. However, if the updates are extensive, a discernable amount of time may be required to transfer a complete EPG update from the remote EPG content system 106 to the media device 102.

For example, the media device 102 may be started at a start time. Based upon the start time, the EPG information is pushed to the media device 102. The EPG information begins at substantially the start time, such as at the closest preceding hour or half hour. The pushed EPG information includes program information for programs scheduled out to some predefined time after the start time or the closest preceding hour or half hour. To illustrate, assume that the media device is started at 8:15 p.m. EPG information beginning at 8:00 p.m. and ending at 12:00 a.m. is pushed to the media device 102. Thus, EPG information spanning a four hour period is available for constructing the EPG 142. The predefined time period may be specified at the media device 102 and communicated to the remote EPG content system 106, may be predefined and saved at the remote EPG content system 106, or may be a time encoded in the EPG access logic 124.

In some embodiments, the media device 102 "selects" which is the most immediately relevant EPG information that it needs. The media device 102 then "pulls" the EPG information of interest and the selected EPG updates of interest are incorporated and/or are saved into the current EPG information 126 of the media device 102. For example, the viewer may be viewing program channel "x" on their media presentation device 146. Here, the media device 102 selects EPG updates for the currently viewed program channel "x" and pulls that EPG information from the current EPG information 156 of the remote EPG content system 106. When the viewer changes to another program channel, the media device 102 selects EPG updates for the newly selected program channel and pulls that EPG information from the current EPG information 156 of the remote EPG content system 106.

In some embodiments, the entire EPG information resides in the current EPG information 156 of the remote EPG content system 106 and may be populated on a dynamic basis. Much like the entire carousel of EPG information provided over the EPG data channel, the media device 102 receives all of its EPG information from the current EPG information 156 of the remote EPG content system 106. When the entirety of the EPG information is received at the media device 102, the backchannel system 104 may be disconnected or ended. Here, the manner and order of the retrieval of the EPG information may be intelligently determined. For example, EPG information for a currently watched program channel, and/or for favorite program channels, may be first retrieved. Additionally, or alternatively, the most current EPG information may be first retrieved, followed by EPG information for later scheduled programming.

The current EPG information 156 of the remote EPG content system 106 may include supplemental information that may be of interest to the viewer. For example, additional program description information may include additional information on the program plot or story line, additional information pertaining to program actors or performers, and/or may provide information about related programming. Typically, such supplemental information is too voluminous for inclusion with the EPG information in the carousel of EPG information. Memory requirement to store the supplemental information in the media device 102 may be too extensive to justify memory costs. The time to receive an entire carousel of EPG information that includes the supplemental information for every program described in the EPG may be to long to be practical. Accordingly, as the viewer is selecting a particular program and/or program channel for current viewing, the media device 102 selects EPG supplemental information for the currently viewed program channel "x" and pulls that EPG information from the current EPG information 156 of the remote EPG content system 106. The EPG supplemental information may be incorporated into the current EPG information 126 of the media device 102, or may be temporarily stored into the memory 112 or stored into another suitable memory (not shown).

In some embodiments where the backchannel system 104 provides for high speed communications, the current EPG information 156 of the remote EPG content system 106 may be populated on a dynamic basis. Thus, no permanent memory storage capacity is used in the memory 112 for storing EPG information. In such embodiments, the carousel of EPG information is no longer used and the EPG data channel 132 is eliminated. Thus, the media device 102 is operable to retrieve EPG information of interest on a dynamic real time basis, or near real time basis. For example, the EPG 142 may be constructed from information pulled from the current EPG information 156 of the remote EPG content system 106 as the viewer is initiating presentation of the EPG 142 on the media presentation device 146. Additional EPG information is retrieved as the viewer navigates about the displayed EPG 142.

In some embodiments, the size of the entire carousel of EPG information may be reduced. For example, the size of the entire carousel of EPG information may be reduced to a few days, a single day, or even a few hours. As operation of the media device 102 begins, and/or as the viewer navigates about the EPG 142 such that EPG information is required that is beyond the time period covered by the carousel of EPG information, the current EPG information 156 of the remote EPG content system 106 may be retrieved. That is, time periods beyond the time covered by the carousel of EPG information can be accessed as needed. Accordingly, less memory capacity of the memory 112 is required to store the entire carousel of EPG information. Further, the time to retrieve an entire carousel of EPG information may be significantly decreased since less program information is included because of the shorter time period encompassed by the carousel of EPG information.

It should be emphasized that the above-described embodiments of the EPG access system 100 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are defined as follows:

1. A method for accessing electronic program guide (EPG) information by a media device, the method comprising:
receiving an initial portion of a carousel of EPG information at the media device in at least one broadcast program content stream, wherein the carousel of EPG information describes a plurality of programs available on a plurality of program channels during a predefined period, wherein an entirety of the carousel of EPG information is periodically broadcasted in the at least one broadcast program content stream to the media device in a serial format, and wherein the received initial portion of the carousel of EPG information is associated with a time period that begins after a current time;
storing the received initial portion of the carousel of EPG information in a memory of the media device as the carousel of EPG information is received; receiving an instruction to present an EPG on a display at the current time, wherein the EPG is configured to present a time period that includes information identifying programs and their associated channels that are available at the current time, and wherein the presented time period of the EPG is less than the predefined period of the carousel of EPG information;
accessing the stored carousel of EPG information for the information identifying the programs and their associated channels that are available during the current time in response to receiving a request to present the EPG;
determining that a current time period portion of the carousel of EPG information only for favorite program channels is not stored in the memory of the media device, wherein the current time period portion of the carousel of EPG information includes the information identifying the programs and their associated channels that are available during the current time;
establishing, at the media device only if the current time period portion of the carousel of EPG information for the favorite program channels is not stored in the memory of the media device, a communication link that communicatively couples a backchannel interface of the media device and a remote EPG content system, wherein the communication link is established over a communication system;
in response to establishing the communication link between the media device and the remote EPG content system at the backchannel interface, sending a first request to the remote EPG content system via the established communication link;
receiving the current time period portion of the carousel of EPG information from the remote EPG content system via the established communication link for the favorite program channels, wherein the current time period portion of the carousel of EPG information includes the information identifying the programs on the favorite program channels that are available during the current time;
subsequent to receiving the current time period portion of the carousel of EPG information for the favorite program channels, sending a second request to the remote EPG content system via the established communication link; and
receiving, from the remote EPG content system via the established communication link, a current time period portion of the carousel of EPG information identifying programs associated with other program channels that are available during the current time, wherein the other program channels are exclusive of the favorite program channels.

2. The method of claim 1, wherein the current time period portion of the carousel of EPG information for the favorite program channels is communicated in a moving pictures experts group (MPEG) format in accordance with at least one of a digital video broadcasting (DVB) standard and an American television standards committee (ATSC) standard.

3. The method of claim 1, further comprising:
pushing the current time period portion for the favorite program channels of the carousel of the EPG information from the remote EPG content system to the media device, wherein a time period associated with the current time period portion of the carousel of EPG information is predefined at the remote EPG content system.

4. A method for accessing electronic program guide (EPG) information by a media device, the method comprising:
starting the media device at a start time, wherein no portions of a carousel of EPG information are stored in a memory of the media device;
in response to starting the media device, tuning a tuner of the media device to receive an initial portion of the carousel of EPG information at the media device in at least one broadcast program content stream, wherein the carousel of EPG information describes a plurality of programs available on a plurality of program channels during a predefined period, wherein an entirety of the carousel of EPG information is periodically broadcasted in the at least one broadcast program content stream to the media device in a serial format, and wherein the received initial portion of the carousel of EPG information is associated with a time period that begins after a current time;
storing the received initial portion of the carousel of EPG information in the memory of the media device as the carousel of EPG information is received; determining, during startup, that no portions of the carousel of EPG information are stored in the memory of the media device;
establishing, at the media device in response to determining during startup that no portions of the carousel of EPG information are stored in the memory of the media device, a communication link that communicatively couples a backchannel interface of the media device and a remote EPG content system, wherein the communication link is established over a communication system that includes the Internet;
in response to establishing the communication link between the media device and the remote EPG content system at the backchannel interface, receiving a current time period portion of the carousel of EPG information for favorite program channels from the remote EPG content system via the established communication link, wherein the current time period portion of the carousel of EPG information for the favorite program channels has information identifying programs associated with the favorite program channels that are available during the current time;
subsequent to receiving the current time period portion of the carousel of EPG information for the favorite program channels, sending a request to the remote EPG content system over the established communication link for a current time period portion of the carousel of EPG information for other program channels, wherein the current time period portion of the carousel of EPG information for other program channels has information identifying programs associated with other program channels that are available during the current time; and
receiving the current time period portion of the carousel of EPG information for other program channels from the remote EPG content system via the established communication link,
wherein receiving the current time period portion of the carousel of EPG information for the favorite program channels begins at substantially the start time and includes program information encompassing the current time.

5. The method of claim 1, further comprising:
pulling the current time period portion of the carousel of the EPG information for the favorite program channels from the remote EPG content system to the media device, wherein the current time period portion of the carousel of EPG information for the favorite program channels is selected by the media device based on a currently selected program channel of interest.

6. The method of claim 5, further comprising:
receiving a request to present the program channel of interest, wherein the current time period portion of the carousel of EPG information for the favorite program channels corresponds to programming available on the requested program channel of interest.

7. The method of claim 6, wherein the program channel of interest corresponds to a current program channel that is currently communicated from the media device to a media presentation device.

8. The method of claim 1, further comprising: tuning a tuner of the media device in response to determining that the current time period portion of the carousel of EPG information for the favorite program channels is not stored in the memory of the media device, wherein the tuner is then configured to receive the at least one broadcast program content stream with the carousel of EPG information for the favorite program channels.

9. The method of claim 1, further comprising:
pulling supplemental EPG information of interest from the remote EPG content system.

10. A media device electronic program guide (EPG) access system, comprising:
a program content stream interface configured to receive at least one program channel and configured to receive an EPG data channel that is broadcasting an initial portion of a carousel of EPG information therein, wherein the carousel of EPG information describes a plurality of programs available on a plurality of program channels during a predefined period, wherein an entirety of the carousel of EPG information is periodically broadcasted to the media device, wherein the EPG information is formatted in a serial format, and wherein the received initial portion of the carousel of EPG information is associated with a time period that begins after a current time;
a memory that is configured to store the received initial portion of the carousel of EPG information;
a remote interface configured to receive an instruction from a remote control to present an EPG on a display, wherein the EPG is configured to initially present a current time period portion of the carousel of EPG information, wherein the current time period portion of the carousel of EPG information includes information identifying programs and their associated channels that are available during the current time that the instruction is received;
a backchannel interface configured to establish a communication link to a remote EPG content system when the current time period portion of the carousel of EPG information for identified favorite program channels is not stored in the memory, and wherein the current time period portion of the carousel of EPG information is received over the communication link in response to establishing the communication link to the remote EPG content system; and
a processor system communicatively coupled to the program content stream interface, the remote interface, and the backchannel interface, wherein the processor system:

determines that the current time period portion of the carousel of EPG information only for the identified favorite program channels is not stored in the memory of the media device, requests the current time period portion of the carousel of EPG information for the identified favorite program channels only if the current time period portion of the carousel of EPG information for the identified favorite program channels is not stored in the memory of the media device, initially constructs the EPG from the received current time period portion of the carousel of EPG information for the identified favorite program channels received at the backchannel interface, subsequent to receiving the current time period portion of the carousel of EPG information for the identified favorite program channels, generates a request to the remote EPG content system over the established communication link for a current time period portion of the carousel of EPG information for other program channels, and constructs the EPG from the received current time period portion of the carousel of EPG information for other program channels received at the backchannel interface.

11. The media device EPG access system of claim 10, further comprising: wherein the remote interface is configured to receive a program channel selection from the remote control, wherein the processor system identifies EPG information of interest based upon the selected program channel, and wherein the current time period portion of the carousel of EPG information for the identified favorite program channels initially includes the identified EPG information of interest.

12. The media device EPG access system of claim 10, wherein the backchannel interface is a modem, wherein the communication link is initially established over the Internet to a server residing at the remote EPG content system.

13. The media device EPG access system of claim 10, wherein the received at least one program channel and the EPG data channel resides in a satellite signal.

14. An electronic program guide (EPG) access system that provides a carousel of EPG information to a media device that stores the carousel of EPG information as the carousel of EPG information is received over a data channel, wherein the carousel of EPG information describes a plurality of programs available on a plurality of program channels during a predefined period, and wherein the carousel of EPG information is periodically broadcasted in a program content stream to the media device, and wherein the EPG information is formatted in a serial format, the system comprising:

a backchannel interface configured to establish a communication link to the media device in response to a request from the media device that indicates that the media device does not have a current time period portion of the carousel of EPG information, wherein the current time period portion of the carousel of EPG information includes information identifying programs and their associated channels that are available during a current time, and in response to the media device establishing the communication link with the EPG access system, the backchannel interface is further configured to communicate the current time period portion of the carousel of EPG information to the media device over the communication link, and wherein the current time period portion of the carousel of EPG information communicated to the media device over the communication link is for an identified list of favorite program channels specified by the media device;

a memory with stored current EPG information; and a processor system communicatively coupled to the backchannel interface and the memory, wherein the processor system:

determines that the current time period portion of the carousel of EPG information only for the favorite program channels is not stored in the memory of the media device, requests a first current time period portion of the carousel of EPG information for the favorite program channels only if the first current time period portion of the carousel of EPG information for the favorite program channels is not stored in the memory of the media device, constructs the first current time period portion of the carousel of EPG information for the favorite program channels based upon the identified list of favorite program channels specified by the media device, communicates the first current time period portion of the carousel of EPG information for the favorite program channels identifying programs associated with the favorite program channels that are available during the current time to the media device over the communication link via the backchannel interface, constructs a second current time period portion of the carousel of EPG information for other program channels identifying programs associated with other program channels that are available during the current time, and subsequent to communicating the first current time period portion of the carousel of EPG information for the favorite program channels, communicates the second current time period portion of the carousel of EPG information for other program channels to the media device over the communication channel via the backchannel interface.

15. The EPG access system of claim 14, wherein the backchannel interface is a server, wherein the communication link is established over the Internet to a modem residing in the media device, and wherein the server is responsive to hypertext transfer protocol (HTTP) requests from a web browser agent executing in the media device.

16. The method of claim 1, further comprising: pulling the current time period portion of the carousel of the EPG information for the favorite program channels from the remote EPG content system to the media device, wherein the current time period portion of the carousel of EPG information for the favorite program channels is selected by the media device based on a plurality of previously identified favorite program channels.

17. The method of claim 1, where in response to a viewer changing to another program channel, the method further comprising: pulling the current time period portion of the carousel of the EPG information for the favorite program channels from the remote EPG content system to the media device, wherein the current time period portion of the carousel of EPG information for the favorite program channels is selected by the media device based on the changed program channel.

18. The EPG access system of claim 14, wherein the identified list of favorite program channels specified by the media device is included as part of the request for the first current time period portion of the carousel of EPG information for the favorite program channels.

* * * * *